Jan. 16, 1968 V. A. LIPPO 3,364,336
HEATED ATMOSPHERE GENERATOR FOR SAUNA ROOMS
Filed Aug. 24, 1965 5 Sheets-Sheet 3

INVENTOR.
VEIKKO A. LIPPO.
BY
Christy, Parmelee & Strickland
ATTORNEYS.

Jan. 16, 1968  V. A. LIPPO  3,364,336
HEATED ATMOSPHERE GENERATOR FOR SAUNA ROOMS
Filed Aug. 24, 1965  5 Sheets-Sheet 4

INVENTOR.
VEIKKO A. LIPPO.
BY
Christy, Parmelee, Strickland
ATTORNEYS.

United States Patent Office 3,364,336
Patented Jan. 16, 1968

3,364,336
HEATED ATMOSPHERE GENERATOR FOR
SAUNA ROOMS
Veikko A. Lippo, R.D. 7, Box 317,
Greensburg, Pa. 15601
Filed Aug. 24, 1965, Ser. No. 482,145
10 Claims. (Cl. 219—275)

ABSTRACT OF THE DISCLOSURE

This application discloses an apparatus for generating a sauna bath atmosphere wherein there is a massive metal body with heating means therefor, the body having numerous elongated passages therein so arranged that when the body has been heated to a predetermined temperature, a measured amount of water is introduced into one end of these passages and is almost instantly flashed into steam. The steam is superheated in flowing through the passages, and discharges into an air duct to generate a surge of air and steam comparable to the original sauna where water is thrown on specially arranged heated stones.

---

This invention relates to Finnish sauna-bath, or more properly the sauna which is a form of exposure of one's body in an enclosed space to a special atmosphere of air and water vapor at temperatures much beyond body temperature.

According to the ancient Finnish practice of sauna, small stones are piled in a special manner, an art which is fast becoming lost, after which a wood fire is burned for hours under the stones until they become heated to a temperature ranging between 600° F. and 1000° F. The fire is then extinguished and a measured amount of water is thrown onto the stone heap. The stones are so arranged that most of the water rapidly reaches the bottom layers. These bottom layers are arranged to arrest the flow of water so that here the bulk of the water is rapidly turned to steam. The heap of stones is arranged to impede the free escape of the steam, and the steam, by contact with the highly-heated stones, is superheated. The superheated expanding steam mixes with the hot dry air in and about the heap of stones, creating a surge of air and steam in the sauna room. This mixture of air and superheated steam generated in a sudden surge is known by the Finnish word "löyly," and the English language has no corresponding equivalent term.

The löyly generator constructed from stones may be used only to a limited extent when the stones will have cooled down to a temperature where a proper löyly can no longer be generated. The air temperature of the sauna room should be initially heated to not be over 170° F. when sauna bathing is started, and then should be quickly raised by löyly generation to a range between 180° F. and 205° F. If the air temperature in the sauna room cannot be raised by löyly generation over 180° F. without being intolerable to human beings, the löyly vapor is too wet; if it can be made to exceed 205° F. and still be tolerable, the vapor is too dry for a proper sauna bath.

Many establishments have come into existence purporting to provide a sauna bath for their customers, or generators for home use called sauna generators have been produced. They are in effect essentially steam vapor or hot air baths incapable of producing the löyly that characterizes a true Finnish sauna.

The present invention is for a löyly generator in the form of a unitary body with heating means to raise it to the required temperature. Provision is made for introducing water into the heated body at a location where it is flashed quickly into steam which travels through lengthy passages in the body and becomes superheated and is discharged into the atmosphere within or around the generator, producing an atmosphere or löyly which is the counterpart of that derived from the ancient Finnish practice. It has the great advantage that heat and water can be more accurately controlled, heat may be continuously supplied to it, enabling the operation to be repeated at successive intervals for indefinite periods of time and without variation in successive operations. It may be brought to operating temperature quickly and does not require the burning of wood and the subsequent removal of ashes and embers.

A primary object of the present invention is to provide a unique means for generating the required atmosphere for a sauna bath.

A further object of the present invention is to provide a generator which will supply the löyly for a sauna bath, which is the counterpart of that provided through the use of heated stones.

A further object is to provide such a generator which will function continuously and uniformly, and which may be intermittently operated for an indefinite period of time.

These and other objects and advantages of my invention may be more fully understood from the following description of certain specific embodiments of my invention in conjunction with the accompanying drawings, wherein:

FIG. 5 is a section similar to FIG. 4 but showing a modified arrangement;

Figure 1:
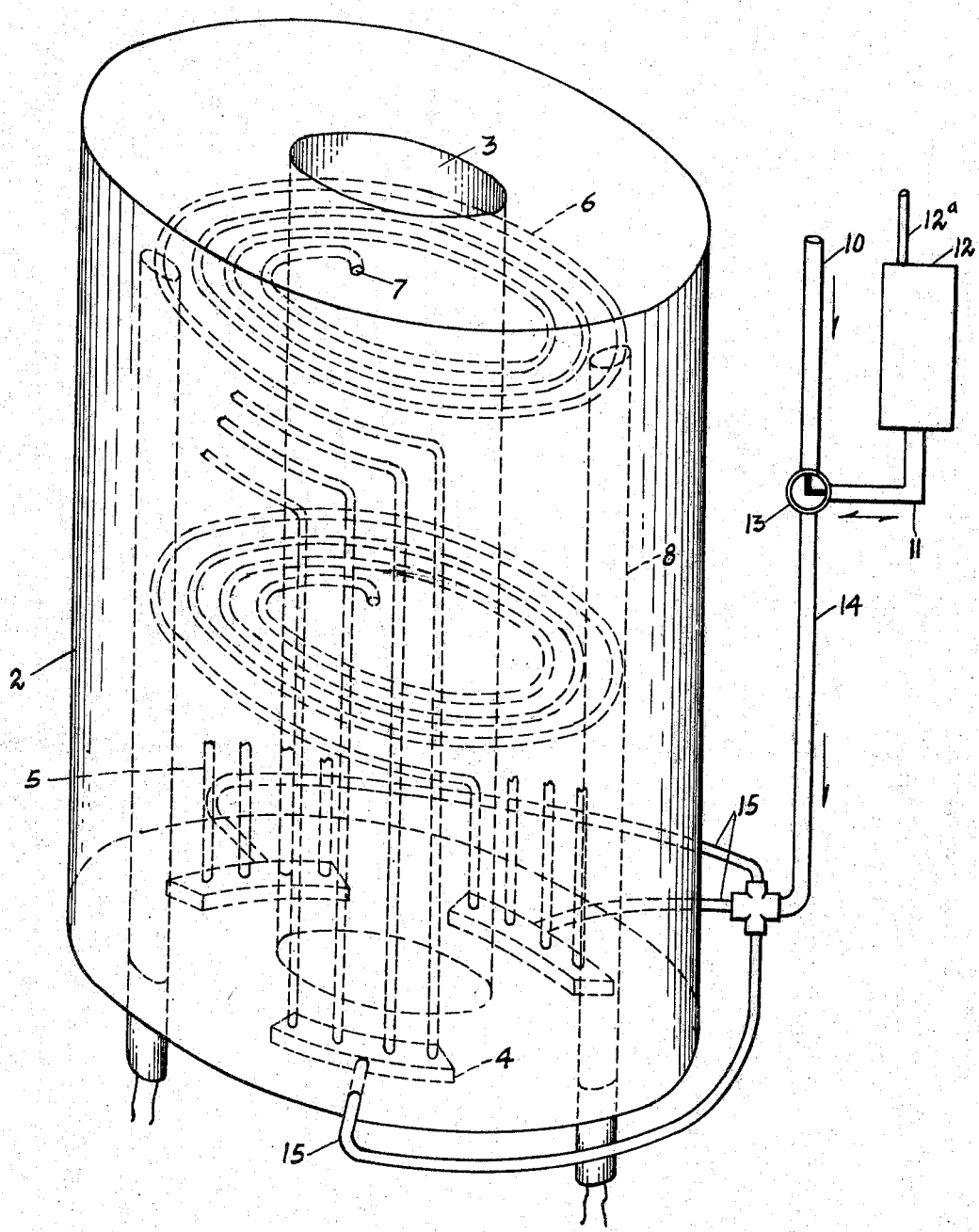
FIG. 1 is a more or less conventional perspective view of one form of generator.
Figure 2:
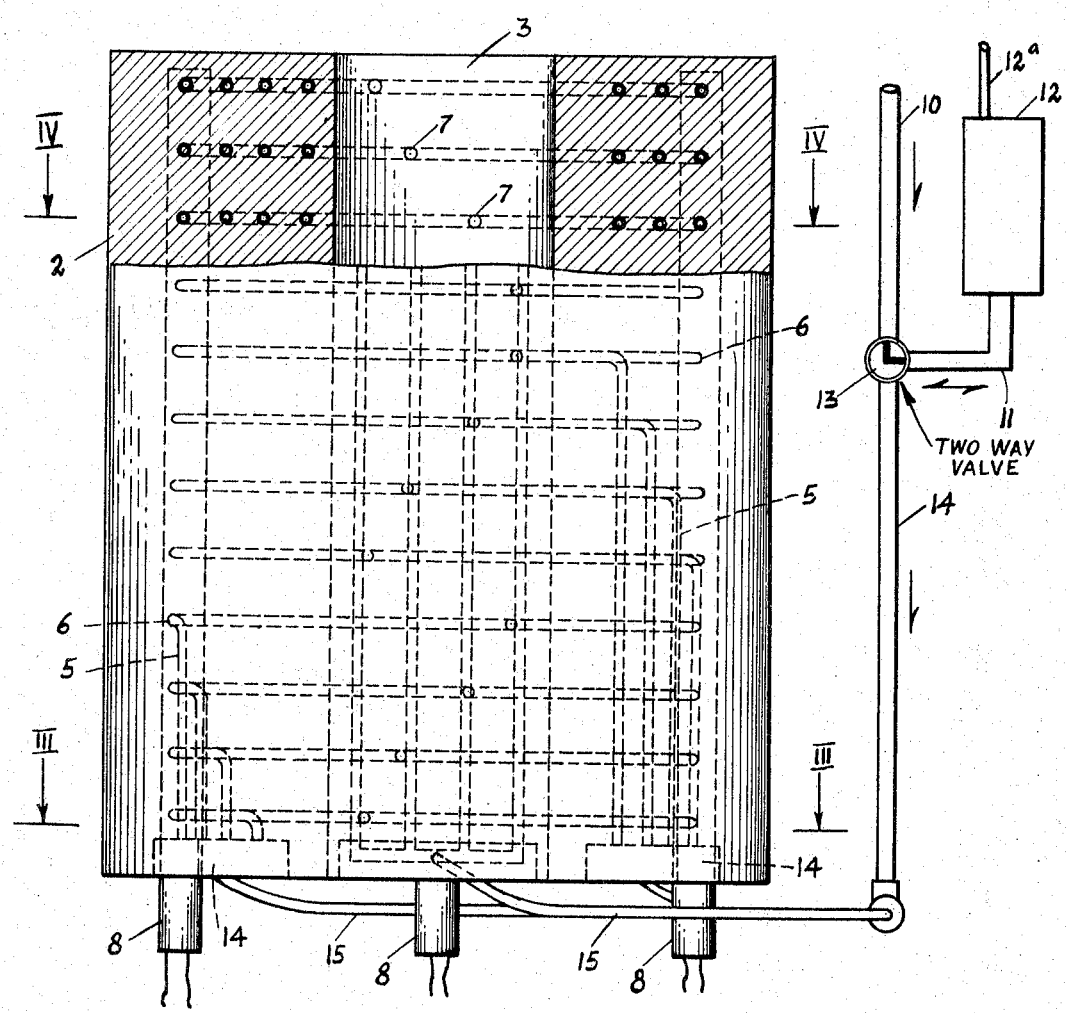
FIG. 2 is a side elevation partly in section of the generator shown in FIG. 1.
Figure 3:
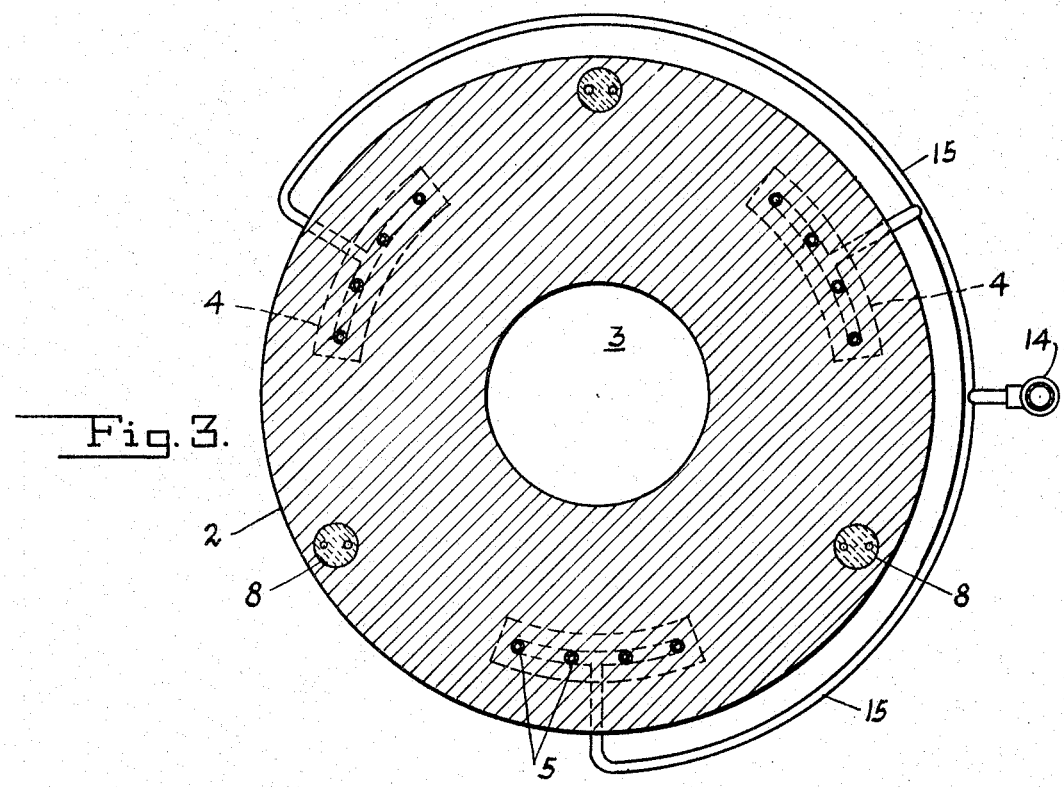
FIG. 3 is a transverse section in the plane of line III—III of FIG. 2.
Figure 4:
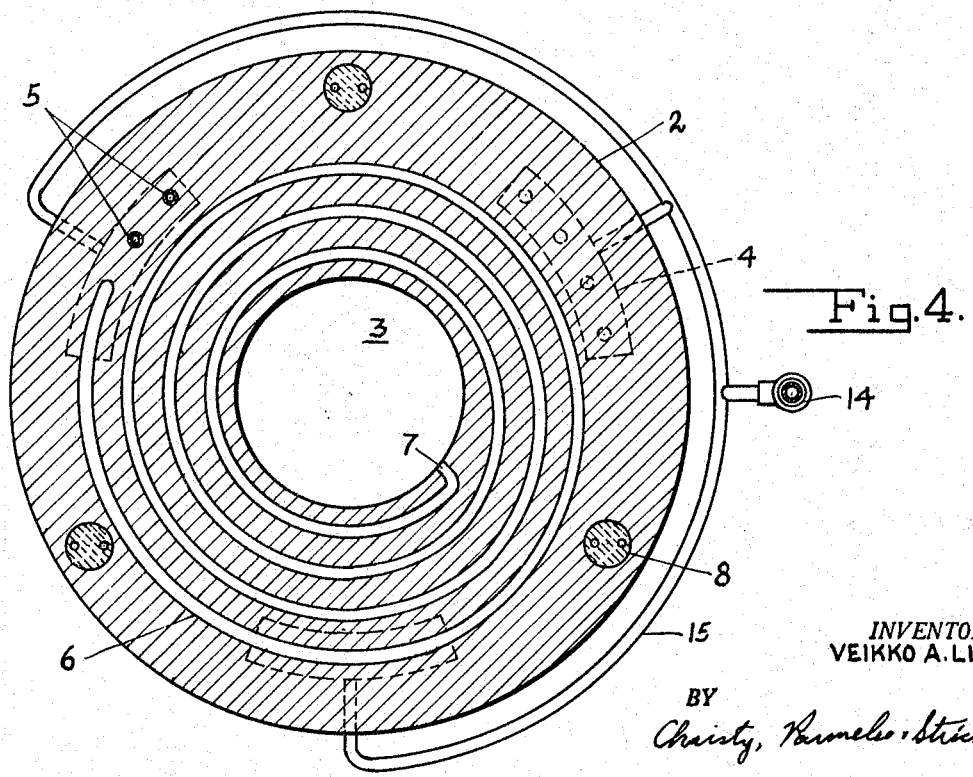
FIG. 4 is a similar section in the plane of line V—V.

Referring first to FIGS. 1 to 4, the generator here disclosed comprises a generally cylindrical massive body 2 having a thick wall and a central passageway 3 therethrough open from top to bottom. Inside the body at the bottom thereof there are one or more manifolds from which lead a plurality of small passages 5 that extend upwardly through the body parallel with the central opening, and which at different levels in the body communicate with spiral passages of the same dimension so that the body has a number of these spiral passages 6, each communicating with a separate vertical passage 5. The other end of each spiral passage 6 opens into the central passage 3 in the cylindrical body. In this way the body has these spiral passages at spaced levels therein from close to the bottom to close to the top, each spiral passage opening into the central passageway 3.

Embedded in the cylindrical body 2 at spaced intervals are electric resistance heaters 8. These resistance heaters are here shown as extending parallel with the axis of the cylinder and are arranged in such manner as to clear the various spiral passages 6 as seen for example in FIGS. 3 and 4.

The vertical and spiral passageways may be formed in various ways in the body 2. They may be constructed first from metal tubes such as copper tubes having an internal cross-sectional area of about one-tenth of a square inch, but this dimension is illustrative and may be varied according to the design and capacity of the generator. After the tubes have been formed the cylinder 2 can be cast from molten aluminum or other metal which surrounds and encloses the tubes. Alternately it can be cast from a sand and cement mix or concrete, or the body may be formed in sections with the passageways 6 formed as grooves in the first of these sections and the riser tubes 5 being provided by registering holes in the sections, the assembly then being bolted together or surrounded by a metal shell that confines the sections. It is desirable that each passage 6 have sufficient convolutions so that its length is about 15 feet in a typical installation. This of course is mentioned as an example and not by way of illustration.

Provision is made for supplying water to the manifold or manifolds 4. As here shown the water supply comprises a supply pipe 10 which may be from an elevated reservoir or from a municipal water system, or other pressure source. According to the preferred embodiment there is a branch pipe 11 connected to the pipe 10 at a level above the bottom of the cylindrical body 2, and this communicates with a vessel 12 of predetermined capacity, and which has an air vent 12a at the top. There is a two-way valve 13 at the juncture of the pipes 10 and 11, and with the valve in the position shown, water may flow from the pipe 10 into the chamber 12 and when water flows from the vent 12a the operator knows the measured volume of water is in the reservoir, and more cannot be retained. By turning the valve 13 a quarter turn, the supply of water from the pipe 10 is cut off and the water will drain from the reservoir 12 into pipe 14, and thence through branches 15 to the respective manifolds 4. When the valve is turned to this position, flow of water from pipe 10 is then shut off.

In operation the electric heaters are energized until the temperature of the cylindrical body is somewhere in the range between 500 and 1000° F. When this temperature has been reached, the valve 13 is turned from the position shown in FIG. 1 to permit the sudden discharge of a measured amount of water into the several manifolds. The water is rapidly vaporized and the expanding steam travels up the tubes 5 and through the coil 6 becoming superheated, and the superheated steam discharges through the partition 7 into the central passage 3 inducing a surge of air through this passage and generating a sudden cloud of air and steam, providing the same effect as where a measured amount of water is thrown into the pile of stones as previously described, producing a löyly effect that is the most significant part of the sauna bath.

The heaters 8 of course continue to be energized, restoring to the cylindrical body 2 the heat extracted by the vaporization of the water so that by the time further atmosphere is to be generated the body 3 is again up to temperature. The massive solid body of the generator acts as a heat storing reservoir so that each operation lowers its temperature only slightly and it is quickly ready for a repeat operation. The frequency with which this operation can be repeated depends of course upon the size and character of the cylindrical body and the conductivity of the material from which the body is made, and the heat-supplying capacity of the heaters 8. A proper procedure is to generate the löyly once a minute for three minutes, and to repeat this cycle of three five times per hour.

Since this device in the example illustrated is electrically heated, the heated atmosphere furnished by it is clean and the nuisance and annoyance of removing embers and ashes is avoided. The device may be located in the sauna room separate from the space to be occupied by the user by a partition open at the top and bottom to provide for the free circulation of vapor and air.

In the modification shown in FIG. 5 the construction is essentially the same as that previously described, except that the spiral passages 6, either some or all of them, open to the outside of the cylinder 2 instead of into the passageway 3. In this instance the cylinder is surrounded by a concentric shell 16 of thin sheet metal so that the air and steam mix in the space between the shell and the body 2.

It will also be understood that instead of using electric resistance heaters 8 as herein described, the cylinder 2 may be inductively heated, particularly if it is formed of metal, in which case an induction coil surrounds the cylinder 2 but is insulated therefrom.

Figure 6:
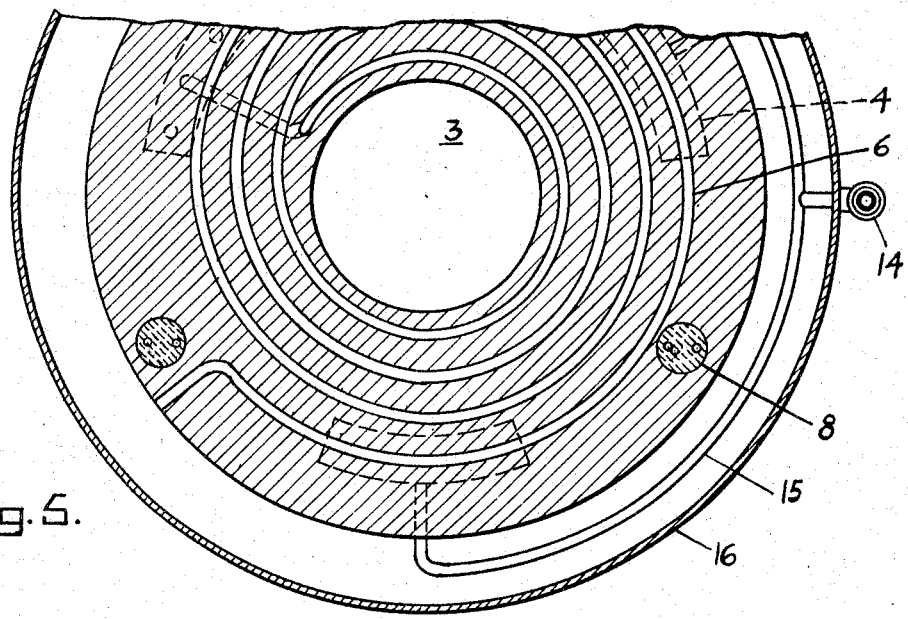
FIG. 6 is a view similar to FIG. 2 showing a different form of heater.

In the modification shown in FIG. 6, corresponding reference numerals indicate corresponding parts, but in this case the reservoir 12 is not shown and water may flow directly to the manifold from an elevated reservoir, float-controlled vessel, or simply by timing, valve 13 indicating any suitable control. Also, in FIG. 6 there are openings 20 extending vertically through the body, and instead of there being electric heaters there is an oil or gas burner 21 at the bottom of each such opening. The flame and hot products of combustion rise through these openings 21 and may be carried off from the top of the unit by flue pipes 22 leading to a common exhaust duct 23.

Figure 7:
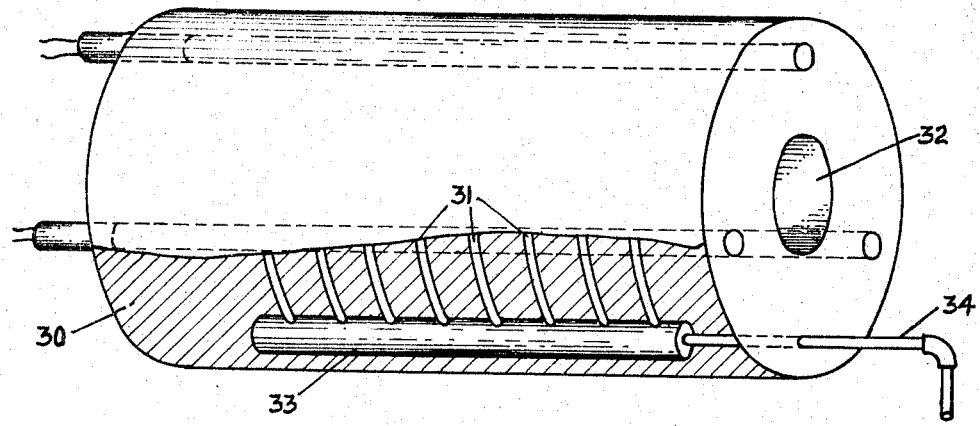
FIG. 7 is a view similar to FIG. 1 showing another modification.
Figure 6:
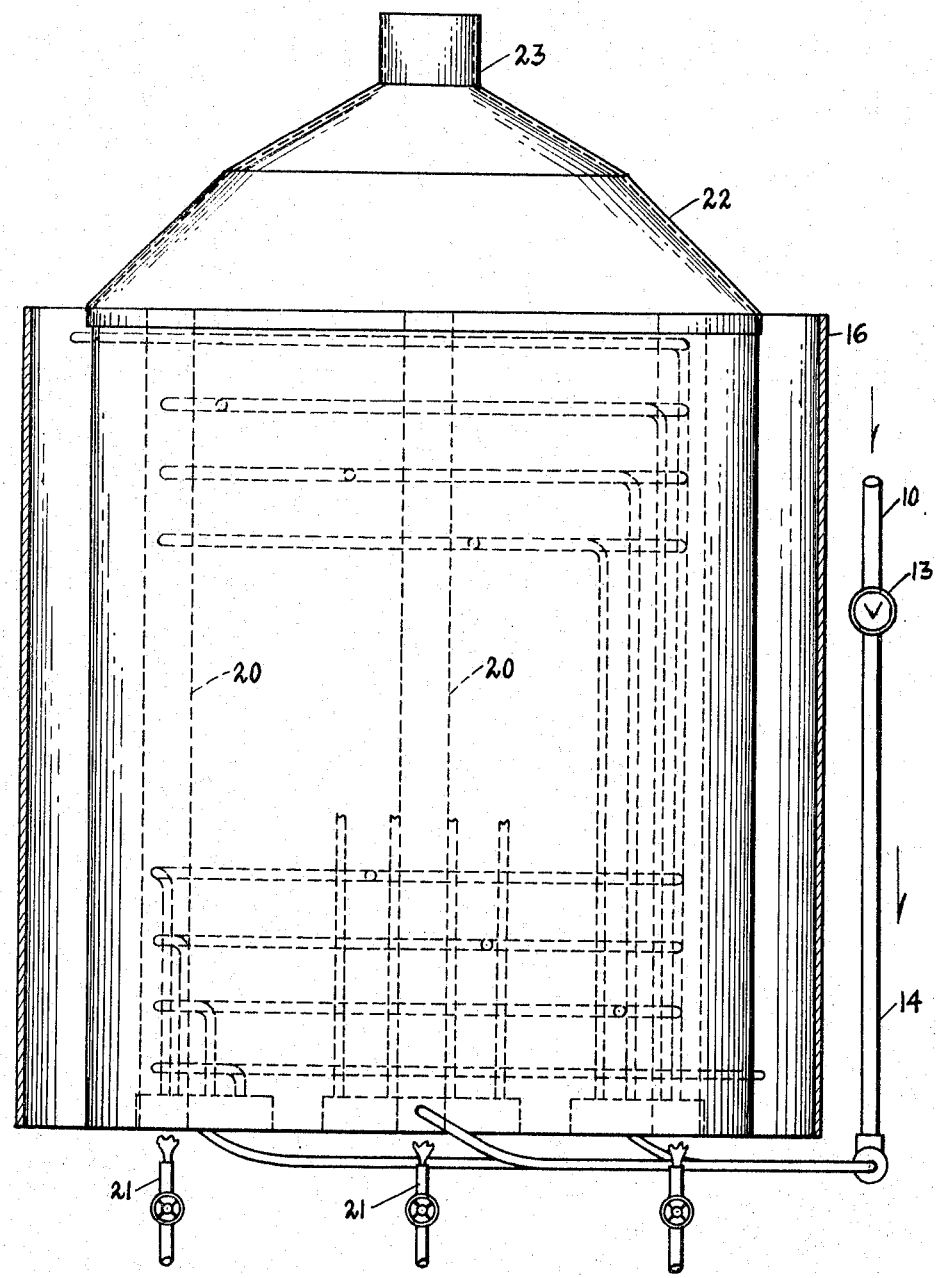

In the modification shown in FIG. 7, the structure is generally similar to that shown in FIG. 1, in that there is a body 30 with a plurality of coiled pipes 31 therein at spaced intervals, these pipes opening into a central passage 32 as in FIG. 1. However, instead of there being a manifold at one end of the body, the manifold 33 extends in a direction of the long axis of the body, and the coils connect directly to the manifold, making pipes 5 unnecessary. This structure is here shown in a horizontal position with the water supply pipe 34 entering one end, but it may be used in a vertical or inclined position with the pipe 34 then being at the top.

Insofar as the various modifications are applicable to other forms herein described, they may be used. For example the water supply arrangement of FIG. 1 may be used in FIG. 6, or vice versa, and the use of the metal shell 16 may be employed in conjunction with the arrangement shown in FIG. 1 with some of the coils 6 opening into the passage 3 and some opening into the space between the shell and the cylinder, or the fluid fluel burner arrangement of FIG. 6 may be used in the other figures. Also the arrangement shown in FIG. 1 may be used in a horizontal position or inclined as described in FIG. 7, and the body, instead of being a circular cylinder, may be otherwise shaped.

While I have shown and described certain specific embodiments of my invention it will be understood that this is by way of illustration and that various changes and modifications may be made within the contemplation of my invention and under the scope of the following claims.

I claim:

1. Apparatus for generating a sauna-bath atmosphere comprising a heat-holding massive body, said body forming at least part of an air-circulating enclosure, means in the body providing a multiplicity of elongated passages of small cross-sectional area pervious to the flow of steam therethrough located throughout the body and terminating in discharge ports opening into said air-circulating enclosure, a manifold in the body with which all of said passages communicate, means for intermittently supplying water to said manifold, and means inside the body for heating it, the arrangement being such that when the body is hot and a limited amount of water enters the manifold, it is converted to steam which becomes superheated in the passageways and escapes into the air-circulating enclosure.

2. Apparatus for generating a sauna-bath atmosphere as defined in claim 1 wherein the air-circulating enclosure is an axial passageway through the body.

3. Apparatus for generating a sauna-bath atmosphere as defined in claim 1 wherein the body has a surrounding casing spaced therefrom and open at both ends, the air-circulating enclosure being formed between the exterior of the body and the said casing.

4. Apparatus for generating a sauna-bath atmosphere as defined in claim 1 wherein the body is in the form of a vertical column and the multiplicity of small passages are of spiral form positioned in spaced transverse level planes from near the top to near the bottom of said body, and the manifold is embedded in the body near the lower end thereof, there being passages for conducting steam from the manifold to the several spiral passages.

5. Apparatus for generating a sauna-bath atmosphere as defined in claim 1 wherein the body is in the form of a vertical column and the multiplicity of small passages are of spiral form positioned in spaced transverse level planes from near the top to near the bottom of said body, and the manifold is embedded in the body near the lower end thereof, and separate passages extending from the manifold to each of the several spiral passages and connected thereto at the ends thereof most remote from their discharge ports.

6. Apparatus for generating a sauna-bath atmosphere as defined in claim 1 wherein the body is in the form of a vertical column and the multiplicity of small passages are of spiral form positioned in spaced transverse level planes from near the top to near the bottom of said body, and the manifold is embedded in the body near the lower end thereof, and separate passages extending from the manifold to each of the several spiral passages and connected thereto at the ends thereof most remote from their discharge ports, said air-circulating enclosure being an axial passageway through the body.

7. Apparatus for generating a sauna-bath atmosphere as defined in claim 1 wherein the body is in the form of a vertical column and the multiplicity of small passages are of spiral form positioned in spaced transverse level planes from near the top to near the bottom of said body, and the manifold is embedded in the body near the lower end thereof, and separate passages extending from the manifold to each of the several spiral passages and connected thereto at the ends thereof most remote from their discharge ports, the body having a concentric casing surrounding the column and spaced therefrom, the air-circulating enclosure being the space between the outside of the body and the casing.

8. Apparatus for generating a sauna-bath atmosphere as defined in claim 1 wherein the water supply means comprises valve means for passing only a predetermined volume of water to the manifold at one time.

9. Apparatus for generating a sauna-bath atmosphere simulating that produced by pouring water onto hot stones as used in an ancient Finnish sauna-bath comprising:
   (a) a solid heat-retaining body in the general form of a vertical cylinder,
   (b) means at intervals along the body in successive transverse planes providing steam passages substantially longer than the diameter of the cylinder,
   (c) a manifold having passages leading therefrom to each of the said steam passages,
   (d) means for heating the body and manifold,
   (e) means for admitting a controlled amount of water to the manifold, and
   (f) means including the body providing an open-ended air duct, said first-named passages each having a discharge end opening into said air duct, the passages from the manifold to the first passages communicating with the first passage at the ends thereof remote from their discharge ends.

10. Apparatus for generating a sauna-bath atmosphere as defined in claim 1 wherein the body is in the form of a cylinder and the multiplicity of small passages are of spiral form positioned in spaced transverse planes from near one end of the body to near the other end of said body and the manifold is embedded in the body and extends in an axial direction therein.

References Cited

UNITED STATES PATENTS

| | | | |
|---|---|---|---|
| 2,002,294 | 5/1935 | McMath | 126—113 |
| 2,487,720 | 11/1949 | Miller et al. | 126—113 |
| 3,277,274 | 10/1966 | Raabe | 219—367 X |
| 3,303,837 | 2/1967 | Rither | 126—113 |

RICHARD M. WOOD, *Primary Examiner.*

C. L. ALBRITTON, *Assistant Examiner.*